United States Patent
Chun et al.

(10) Patent No.: US 8,543,089 B2
(45) Date of Patent: Sep. 24, 2013

(54) METHOD FOR PERFORMING AN AUTHENTICATION OF ENTITIES DURING ESTABLISHMENT OF WIRELESS CALL CONNECTION

(75) Inventors: Sung-Duck Chun, Gyeonggi-Do (KR); Young-Dae Lee, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 579 days.

(21) Appl. No.: 12/596,660

(22) PCT Filed: Apr. 30, 2008

(86) PCT No.: PCT/KR2008/002463
§ 371 (c)(1), (2), (4) Date: Oct. 19, 2009

(87) PCT Pub. No.: WO2008/133481
PCT Pub. Date: Nov. 6, 2008

(65) Prior Publication Data
US 2010/0144313 A1 Jun. 10, 2010

Related U.S. Application Data

(60) Provisional application No. 60/915,042, filed on Apr. 30, 2007.

(30) Foreign Application Priority Data

Apr. 30, 2008 (KR) ......................... 10-2008-0040312

(51) Int. Cl.
*H04M 1/66* (2006.01)
*H04L 12/28* (2006.01)

(52) U.S. Cl.
USPC ............................................ 455/410; 370/255

(58) Field of Classification Search
USPC .......................................... 455/410; 370/255
See application file for complete search history.

(56) References Cited

U.S. PATENT DOCUMENTS

| 4,205,200 A | 5/1980 | Parikh et al. |
| 5,588,009 A | 12/1996 | Will |

(Continued)

FOREIGN PATENT DOCUMENTS

| CN | 1719932 | 1/2006 |
| CN | 1731887 | 2/2006 |

(Continued)

OTHER PUBLICATIONS

Ericsson, "MAC header for Improved L2 support for high data rates", R2-070810, 3GPP TSG-RAN WG2#57, Feb. 2007, XP50133836.

(Continued)

*Primary Examiner* — Kent Chang
*Assistant Examiner* — Scott Au
(74) *Attorney, Agent, or Firm* — Lee, Hong, Degerman, Kang & Waimey

(57) ABSTRACT

Disclosed is the method for establishing a connection between a base station and a terminal so as to transmit and receive data in the E-UMTS (Evolved Universal Mobile Telecommunications System) or LTE (Long-Term Evolution) system, and more particularly, to a method for determining, by each entity, whether to establish a connection by comparing an authentication input value transmitted from a counterpart entity with an authentication input range.

8 Claims, 3 Drawing Sheets

(56) References Cited

U.S. PATENT DOCUMENTS

| | | |
|---|---|---|
| 6,173,057 B1 | 1/2001 | Truong et al. |
| 6,233,430 B1 | 5/2001 | Helferich |
| 6,567,409 B1 | 5/2003 | Tozaki et al. |
| 6,725,267 B1 | 4/2004 | Hoang |
| 6,785,256 B2 | 8/2004 | O'Neill |
| 6,795,419 B2 | 9/2004 | Parantainen et al. |
| 7,032,242 B1 | 4/2006 | Grabelsky et al. |
| 7,039,425 B1 | 5/2006 | Mazawa et al. |
| 7,245,707 B1 | 7/2007 | Chan |
| 7,373,148 B2 | 5/2008 | Kim et al. |
| 7,443,813 B2 | 10/2008 | Hwang et al. |
| 7,525,908 B2 | 4/2009 | Olsson et al. |
| 7,551,643 B2 | 6/2009 | Yeo et al. |
| 7,606,370 B2 | 10/2009 | Lillie et al. |
| 7,680,058 B2 | 3/2010 | Seurre et al. |
| 7,769,351 B2 | 8/2010 | Kwak et al. |
| 7,801,527 B2 | 9/2010 | Putcha |
| 7,864,731 B2 | 1/2011 | Forsberg |
| 7,899,451 B2 | 3/2011 | Hu et al. |
| 7,912,471 B2 | 3/2011 | Kodikara Patabandi et al. |
| 7,916,697 B2 | 3/2011 | Eklund |
| 7,958,542 B2 | 6/2011 | Herrmann |
| 8,064,676 B2 | 11/2011 | Li et al. |
| 2001/0017850 A1 | 8/2001 | Kalliokulju |
| 2001/0034791 A1 | 10/2001 | Clubb et al. |
| 2002/0028690 A1 | 3/2002 | McKenna et al. |
| 2002/0057663 A1 | 5/2002 | Lim |
| 2002/0059464 A1 | 5/2002 | Hata et al. |
| 2002/0091860 A1 | 7/2002 | Kalliokulju et al. |
| 2002/0114294 A1 | 8/2002 | Toskala et al. |
| 2003/0007490 A1 | 1/2003 | Yi et al. |
| 2003/0050078 A1 | 3/2003 | Motegi et al. |
| 2003/0119488 A1 | 6/2003 | Hans et al. |
| 2003/0123485 A1 | 7/2003 | Yi et al. |
| 2003/0139170 A1 | 7/2003 | Heo |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 | 11/2003 | Willenegger et al. |
| 2003/0223452 A1 | 12/2003 | Toskala et al. |
| 2004/0014452 A1 | 1/2004 | Lim et al. |
| 2004/0039830 A1 | 2/2004 | Zhang et al. |
| 2004/0042507 A1 | 3/2004 | Pelletier et al. |
| 2004/0087320 A1 | 5/2004 | Kim et al. |
| 2004/0100940 A1 | 5/2004 | Kuure et al. |
| 2004/0117860 A1 | 6/2004 | Yi et al. |
| 2004/0147269 A1 | 7/2004 | Kim |
| 2004/0148427 A1 | 7/2004 | Nakhjiri et al. |
| 2004/0180675 A1 | 9/2004 | Choi et al. |
| 2004/0185837 A1 | 9/2004 | Kim et al. |
| 2004/0202107 A1 | 10/2004 | Bensimon et al. |
| 2004/0229605 A1 | 11/2004 | Hwang et al. |
| 2004/0233870 A1 | 11/2004 | Willenegger et al. |
| 2004/0242195 A1* | 12/2004 | Chun et al. .......... 455/410 |
| 2004/0253959 A1 | 12/2004 | Hwang et al. |
| 2005/0009527 A1 | 1/2005 | Sharma |
| 2005/0032555 A1 | 2/2005 | Jami et al. |
| 2005/0037767 A1 | 2/2005 | Kim et al. |
| 2005/0041610 A1 | 2/2005 | Lee et al. |
| 2005/0041681 A1 | 2/2005 | Lee et al. |
| 2005/0053029 A1 | 3/2005 | Lee et al. |
| 2005/0063347 A1 | 3/2005 | Sarkkinen et al. |
| 2005/0070253 A1 | 3/2005 | Farnsworth et al. |
| 2005/0085254 A1 | 4/2005 | Chuah et al. |
| 2005/0094670 A1 | 5/2005 | Kim |
| 2005/0100048 A1 | 5/2005 | Chun et al. |
| 2005/0141462 A1 | 6/2005 | Aerrabotu et al. |
| 2005/0141541 A1 | 6/2005 | Cuny et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0249188 A1 | 11/2005 | Hayashi |
| 2005/0265294 A1 | 12/2005 | Hu et al. |
| 2005/0286470 A1 | 12/2005 | Asthana et al. |
| 2005/0288022 A1 | 12/2005 | Ryu et al. |
| 2006/0013165 A1 | 1/2006 | Choi et al. |
| 2006/0034335 A1 | 2/2006 | Karaoguz et al. |
| 2006/0039309 A1 | 2/2006 | Lee et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0126570 A1 | 6/2006 | Kim et al. |
| 2006/0142019 A1 | 6/2006 | Kroth et al. |
| 2006/0165045 A1 | 7/2006 | Kim et al. |
| 2006/0187846 A1 | 8/2006 | Pelletier et al. |
| 2006/0195540 A1 | 8/2006 | Hamilton et al. |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0024972 A1 | 2/2007 | Kuerz et al. |
| 2007/0041349 A1 | 2/2007 | Kim et al. |
| 2007/0041382 A1 | 2/2007 | Vayanos et al. |
| 2007/0047452 A1 | 3/2007 | Lohr et al. |
| 2007/0047582 A1 | 3/2007 | Malkamäki |
| 2007/0060139 A1 | 3/2007 | Kim et al. |
| 2007/0064631 A1 | 3/2007 | Tseng et al. |
| 2007/0064665 A1 | 3/2007 | Zhang et al. |
| 2007/0155389 A1 | 7/2007 | Zhang |
| 2007/0155390 A1 | 7/2007 | Kodikara Patabandi et al. |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0178875 A1 | 8/2007 | Rao et al. |
| 2007/0206531 A1 | 9/2007 | Pajukoski et al. |
| 2007/0224993 A1 | 9/2007 | Forsberg |
| 2007/0248075 A1 | 10/2007 | Liu et al. |
| 2007/0254679 A1 | 11/2007 | Montojo et al. |
| 2007/0258591 A1 | 11/2007 | Terry et al. |
| 2007/0291634 A1 | 12/2007 | Kwon et al. |
| 2007/0291646 A1 | 12/2007 | Ohishi et al. |
| 2007/0291673 A1 | 12/2007 | Demirhan et al. |
| 2007/0291695 A1 | 12/2007 | Sammour et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2007/0293224 A1 | 12/2007 | Wang et al. |
| 2008/0004058 A1 | 1/2008 | Jeong et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0186946 A1 | 8/2008 | Marinier et al. |
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0259912 A1 | 10/2008 | Wang et al. |
| 2008/0267126 A1 | 10/2008 | Vujcic et al. |
| 2008/0267405 A1 | 10/2008 | Vialen et al. |
| 2008/0268850 A1 | 10/2008 | Narasimha et al. |
| 2008/0273610 A1 | 11/2008 | Malladi et al. |
| 2008/0280567 A1 | 11/2008 | Sharma |
| 2008/0285691 A1 | 11/2008 | Onggosanusi et al. |

| | | | | | | |
|---|---|---|---|---|---|---|
| 2008/0287091 | A1 | 11/2008 | Suzuki et al. | KR | 10-2005-0063174 A | 6/2005 |
| 2008/0310452 | A1 | 12/2008 | Vedantham et al. | KR | 20050096763 | 10/2005 |
| 2008/0316959 | A1 | 12/2008 | Bachl et al. | RU | 2249917 | 4/2005 |
| 2009/0005051 | A1 | 1/2009 | Voyer et al. | WO | 0054521 | 9/2000 |
| 2009/0022107 | A1 | 1/2009 | Kapoor et al. | WO | 0074416 | 12/2000 |
| 2009/0034466 | A1 | 2/2009 | Lindskog et al. | WO | 0105050 | 1/2001 |
| 2009/0040982 | A1 | 2/2009 | Ho et al. | WO | 0239622 | 5/2002 |
| 2009/0086659 | A1 | 4/2009 | Pani et al. | WO | 2004043099 | 5/2004 |
| 2009/0086710 | A1 | 4/2009 | Ho | WO | 2004064272 | 7/2004 |
| 2009/0092076 | A1 | 4/2009 | Zheng et al. | WO | 2006/000876 | 1/2006 |
| 2009/0109912 | A1 | 4/2009 | DiGirolamo et al. | WO | 2006/011763 | 2/2006 |
| 2009/0124259 | A1 | 5/2009 | Attar et al. | WO | 2006018670 | 2/2006 |
| 2009/0143074 | A1 | 6/2009 | Pelletier et al. | WO | 2006/049441 | 5/2006 |
| 2009/0163199 | A1 | 6/2009 | Kazmi et al. | WO | 2006/075820 | 7/2006 |
| 2009/0181710 | A1 | 7/2009 | Pani et al. | WO | 2006104344 | 10/2006 |
| 2009/0207771 | A1 | 8/2009 | Lindskog et al. | WO | 2006109851 | 10/2006 |
| 2009/0239538 | A1 | 9/2009 | Motegi et al. | WO | 2006/116620 | 11/2006 |
| 2009/0264164 | A1 | 10/2009 | Chun et al. | WO | 2007/025138 | 3/2007 |
| 2009/0318170 | A1 | 12/2009 | Lee et al. | WO | 2007052888 | 5/2007 |
| 2010/0027413 | A1 | 2/2010 | Park et al. | WO | 2007/078929 | 7/2007 |
| 2010/0046384 | A1 | 2/2010 | Lee et al. | WO | 2007078155 | 7/2007 |
| 2010/0061330 | A1 | 3/2010 | Hanov | WO | 2007078172 | 7/2007 |
| 2010/0067495 | A1 | 3/2010 | Lee et al. | WO | 2007133034 | 11/2007 |
| 2010/0075635 | A1 | 3/2010 | Lim et al. | WO | 2008/042889 | 4/2008 |
| 2010/0128669 | A1 | 5/2010 | Chun et al. | WO | 2008/054103 | 5/2008 |
| 2010/0137016 | A1 | 6/2010 | Voyer | WO | 2008/096984 | 8/2008 |
| 2010/0165901 | A1 | 7/2010 | Kim | WO | 2008/111684 | 9/2008 |
| 2010/0195568 | A1 | 8/2010 | Iimori | WO | 2009/084998 | 7/2009 |
| 2010/0227614 | A1 | 9/2010 | Chun et al. | | | |
| 2010/0238799 | A1 | 9/2010 | Sebire | | | |
| 2010/0238903 | A1 | 9/2010 | Kitazoe | | | |
| 2010/0254340 | A1 | 10/2010 | Park et al. | | | |
| 2010/0265896 | A1 | 10/2010 | Park et al. | | | |
| 2010/0272004 | A1 | 10/2010 | Maeda et al. | | | |
| 2010/0309877 | A1 | 12/2010 | Damnjanovic et al. | | | |
| 2011/0039536 | A1 | 2/2011 | Lee et al. | | | |
| 2011/0090836 | A1 | 4/2011 | Mochizuki et al. | | | |
| 2011/0116436 | A1 | 5/2011 | Bachu et al. | | | |
| 2011/0182243 | A1 | 7/2011 | Gallagher et al. | | | |
| 2011/0207427 | A1 | 8/2011 | Kitani et al. | | | |
| 2011/0261743 | A1 | 10/2011 | Futaki et al. | | | |
| 2012/0002589 | A1 | 1/2012 | Saifullah et al. | | | |

FOREIGN PATENT DOCUMENTS

| | | |
|---|---|---|
| CN | 1835627 | 9/2006 |
| CN | 101682591 | 9/2012 |
| EP | 0889664 | 7/1999 |
| EP | 1148753 | 10/2001 |
| EP | 1168877 | 1/2002 |
| EP | 1209938 | 5/2002 |
| EP | 1304898 | 4/2003 |
| EP | 1315356 | 5/2003 |
| EP | 1318632 | 6/2003 |
| EP | 1337124 | 8/2003 |
| EP | 1372310 | 12/2003 |
| EP | 1511245 | 3/2005 |
| EP | 1517565 | 3/2005 |
| EP | 1720322 | 11/2006 |
| EP | 1720373 | 11/2006 |
| JP | 06-006294 | 1/1994 |
| JP | 2003-087180 | 3/2003 |
| JP | 2003-196775 | 7/2003 |
| JP | 2003-235064 | 8/2003 |
| JP | 2004-134904 | 4/2004 |
| JP | 2005-039726 | 2/2005 |
| JP | 2005057787 | 3/2005 |
| JP | 2005354488 | 12/2005 |
| JP | 2006067115 | 3/2006 |
| JP | 2006528456 | 12/2006 |
| JP | 2007165635 | 6/2007 |
| JP | 2009540721 | 11/2009 |
| JP | 2009542100 | 11/2009 |
| KR | 10-2000-0039404 A | 7/2000 |
| KR | 2001-0093687 | 10/2001 |
| KR | 10-2001-0105240 | 11/2001 |
| KR | 10-2003-0026924 | 4/2003 |
| KR | 20040039944 | 5/2004 |
| KR | 20040048675 | 6/2004 |
| KR | 20050008440 | 1/2005 |

OTHER PUBLICATIONS

Ericsson, "Initial Random Access Procedure for E-UTRAN", Tdoc R2-062853, 3GPP TSG-RAN WG2 #55, Oct. 2006.
Samsung, "LTE Random access procedure", R2-062258, 3GPP TSG RAN2#54, Sep. 2006.
Siemens, "Initial Access Procedure", R2-061931, 3GPP TSG-RAN WG2 LTE AdHoc Meeting, Jun. 2006.
IPWireless, "Contention Resolution in Non-synchronous RACH Access", Tdoc R2-062269, RAN2#54, Sep. 2006.
Nokia Corp., "MAC Header Format," 3GPP TSG-RAN WG2 Meeting #59 bis, R2-073891, Oct. 2007, XP-002602993.
LG Electronics Inc., "Support for VoIP over MAC-hs/ehs," 3GPP TSG-RAN WG2 Meeting #57 bis, R2-071542, Mar. 2007, XP-050134474.
Alcatel-Lucent, "DL Control Signaling and Multiplexing for VoIP," 3GPP TSG-RAN WG1 Meeting #48 bis, R1-071721, Mar. 2007, XP-002460800.
3rd Generation Partnership Project (3GPP); "Technical Specification Group Radio Access Network; Evolved Universal Terrestrial Radio Access (E-UTRA) Medium Access Control (MAC) Protocol Specification (Release 8)," 3GPP TS 36.321, v8.1.0, Mar. 2008, XP-050377617.
LG Electronics Inc., "UL Timing Control Related to Contention Resolution," R2-081607, 3GPP TSG-RAN WG2 #61 bis, Mar. 2008, XP-050139334.
Bosch, "Header Compression Signalling," TSGR2#9(99)i32, TSG-RAN Working Group 2 (Radio Layer 2 and Radio Layer 3), Nov. 1999, XP-050114120.
3rd Generation Partnership Project (3GPP), "Technical Specification Group Radio Access Network; Packet Data Convergence Protocol (PDCP) Specification (Release 7)," 3GPP TS 25.323, v7.4.0, Mar. 2007, XP-050367856.
NTT Docomo, Inc., "E-mail Discussion on U-plane ciphering location for LTE", R2-071293, 3GPP TSG RAN WG2#57bis, Mar. 2007.
LG Electronics, "U-plane ciphering at MAC/Physical Layer", R2-071550, 3GPP TSG RAN WG2#57bis, Mar. 2007.
LG Electronics Inc., "Relative Buffer Status Reporting," 3GPP TSG-RAN WG2 Meeting #46bis, R2-050852, Apr. 2005.
IP Wireless, "Layer 2 Functions for LTE," 3GPP TSG RAN WG2 #48bis, R2-052377, Oct. 2005.
Samsung, "Re-use of PDCP SN at ARQ Level?," 3GPP TSG-RAN2 Meeting #53bis, R2-061829, Jun. 2006.
Panasonic, "MAC PDU Format for LTE," 3GPP TSG RAN WG2 #56bis, R2-070096, Jan. 2007.

Samsung, "Selective Forwarding/Retransmission During HO," 3GPP TSG-RAN2 Meeting #56bis, R2-070130, Jan. 2007.
Nokia, "Requirements for Redirection in E-UTRAN," 3GPP TSG-RAN WG2 Meeting #56-bis, R2-070107, Jan. 2007.
ASUSTeK, "Granularity Consideration for Variable RLC PDU Sizes," R2-070336, 3GPP TSG-RAN WG2 Meeting #56 bis, Jan. 2007, XP-050133423.
3rd Generation Partnership Project (3GPP), "Technical Specification Group Radio Access Network; Medium Access Control (MAC) Protocol Specification (Release 7)," 3GPP TS 25.321, v7.4.0, Mar. 2007, XP-050367709.
Y. Gao et al., "Research on the Access Network and MAC Technique for Beyond 3G Systems," IEEE Wireless Communications, Apr. 2007, XP-011184637.
Sammour, M.; "Method and System for Enhancing Discontinuous Reception in Wireless Systems"; U.S. Appl. No. 60/863,185; Oct. 27, 2006.
Nokia, "Active mode DRX details," R2-062753, 3GPP TSG-RAN WGx Meeting #55, Oct. 2006, XP-002437990.
NTT DoCoMo, Inc., "Views on DRX/DTX control in LTE," R2-063397, 3GPP TSG RAN WG2 #56, Nov. 2006.
Email Rapporteur (Nokia), "DRX in E-UTRAN," R2-070463, 3GPP TSG-RAN WG2 Meeting #57, Feb. 2007.
NTT Docomo, Inc., "MAC PDU Structure for LTE", 3GPP TSG RAN WG2 #56bis, R2-070280, XP-050133369, Jan. 15, 2007.
Catt, et al., "Enhancement to Buffer Status Reporting", 3GPP TSG RAN WG2 #57bis, R2-071345, XP-050134291, Mar. 26, 2007.
LG Electronics, Inc., "PDCP Retransmissions," 3GPP TSG-RAN WG2 #59, R2-073041, XP-050135778, Aug. 19, 2007.
LG Electronics, Inc., "PDCP Structure and Traffic Path," 3GPP TSG-RAN WG2 #59, R2-073259, XP-050135985, Aug. 20, 2007.
LG Electronics, Inc., "Contents of PDCP Status Report," 3GPP TSG-RAN WG2 #59, R2-07xxxx, XP-002580785, Oct. 8, 2007.
IPWireless, "Contention Resolution in Non-synchronous RACH Access", R2-062269, RAN2 #54, Aug. 2006.
LG Electronics, "Discussion on Message 4 in Random Access", R2-070519, 3GPP TSG-RAN WG2 #57, Feb. 2007.
LG Electronics, "Discussion on Message 4 in Random Access", R2-071456, 3GPP TSG-RAN WG2 #57bis, Mar. 2007.
LG Electronics, "Discussion on Message 4 in Random Access", R2-071923, 3GPP TSG-RAN WG2 #58, May 2007.
LG Electronics, "DRX Scheme", R2-070265, 3GPP TSG-RAN WG2 #56bis, Jan. 2007.
Nokia, "Discontinuous reception in CELL_FACH", R2-071403, 3GPP TSG-RAN WG2 Meeting #58, Mar. 2007.
Catt, "Non-synchronized access and C-RNTI allocation", R2-062933, 3GPP TSG-RAN WG2 #55, Oct. 2006.
United States Patent and Trademark Office U.S. Appl. No. 12/438,523, Final Office Action dated Jan. 22, 2013, 11 pages.
United States Patent and Trademark Office U.S. Appl. No. 12/602,762, Final Office Action dated Dec. 7, 2012, 11 pages.
Korean Intellectual Property Office Application Serial No. 10-2007-0012749, Notice of Allowance dated Jan. 18, 2013, 2 pages.
Korean Intellectual Property Office Application Serial No. 10-2007-0081356, Office Action dated Feb. 28, 2013, 2 pages.
Taiwan Intellectual Property Office Application Serial No. 096140865, Office Action dated Feb. 8, 2013, 6 pages.
Qualcomm Europe, "Open issues in random access procedure", R2-063034, 3GPP TSG-RAN WG2 #55, Oct. 2006, 1 page.
NEC, "Fast setup for PS services (CELL PCH & URA PCH)", R2-062328, 3GPP TSG-RAN2 Meeting #54, Aug. 2006.
LG Electronics, "Multi-level DRX Operation in CELL_PCH", R2-071930, 3GPP TSG-RAN WG2 #58, May 2007.
Samsung, "LTE Handover procedures, text proposal", R2-061338, 3GPP TSG-RAN3 Meeting #53, May 2006, 13 pages.
Samsung, "UL Timing Sync Procedure", R2-0601006, 3GPP TSG RAN2#52, Mar. 2006, 4 pages, XP002434793.
European Patent Office Application Serial No. 07793615.1 Search Report dated Feb. 18, 2013, 7 pages.
European Patent Office Application Serial No. 07833694.8, Search Report dated Mar. 1, 2013, 8 pages.
European Patent Office Application Serial No. 07833143.6, Search Report dated Mar. 5, 2013, 10 pages.
United States Patent and Trademark Office U.S. Appl. No. 12/113,816, Final Office Action dated May 6, 2013, 30 pages.
Samsung, "LTE Handover procedures, text proposal," 3GPP TSG-RAN3 Meeting #53, Tdoc R2-061338, May 2006, 16 pages.
Ericsson, "Initial, Random Access and Identity Handling," TSG-RAN WG2 Meeting #51, Tdoc R2-060592, Feb. 2006, 7 pages.
Samsung, "Contention resolution in aRACH," 3GPP TSG-RAN WG2 #57bis, R2-071386, Mar. 2007, 4 pages.
TD Tech, "Contention Resolution and Initial Random Access," 3GPP TSG-RAN WG2 #57, R2-070910, Feb. 2007, 7 pages.
IPWireless, "Initial Access Procedure and C-RNTI Allocation," 3GPP TSG RAN WG2 #56bis, R2-070301, Jan. 2007, 4 pages.
IPWireless, "Contention Resolution in Non-synchronous RACH Access," RAN2 #54, Tdoc R2-062269, Aug. 2006, 5 pages.
Taiwan Intellectual Property Office Application Serial No. 096131116, Office Action dated Apr. 26, 2013, 9 pages.
Japan Patent Office Application Serial No. 2012-110474, Notice of Allowance dated May 1, 2013, 3 pages.
European Patent Office Application Serial No. 07833692.2, Search Report dated May 7, 2013, 7 pages.
LG Electronics, "Initial access procedure," 3GPP TSG RAN WG2 #Ad Hoc on LTE, R2-061986, Jun. 2006, 6 pages.
Taiwan Intellectual Property Office Application Serial No. 096140865, Office Action dated May 6, 2013, 6 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)," 3GPP TR 25.813 V1.0.0, Jun. 2006, 39 pages.
Ericsson, "DRX and DTX in LTE_Active," TSG-RAN WG2 Meeting #52, Tdoc R2-060967, Mar. 2006, 5 pages.
United States Patent and Trademark Office Application U.S. Appl. No. 12/438,523, Office Action dated May 23, 2013, 12 pages.

* cited by examiner (a) Successful Case (a) failure Case

METHOD FOR PERFORMING AN AUTHENTICATION OF ENTITIES DURING ESTABLISHMENT OF WIRELESS CALL CONNECTION

CROSS-REFERENCE TO RELATED APPLICATIONS

This application is the National Stage filing under 35 U.S.C. §371 of International Application No. PCT/KR2008/002463, filed on Apr. 30, 2008, which claims the benefit of earlier filing date and right of priority to Korean Application No. 10-2008-0040312, filed on Apr. 30, 2008, and also claims the benefit of U.S. Provisional App. Ser. No. 60/915,042, filed on Apr 30, 2007.

TECHNICAL FIELD

The present invention relates to a method for establishing a connection between a base station and a terminal so as to transmit and receive data in the E-UMTS (Evolved Universal Mobile Telecommunications System) or LTE (Long-Term Evolution) system, and more particularly, to a method for determining, by each entity, whether to establish a connection by comparing an authentication input value transmitted from a counterpart entity with an authentication input range.

BACKGROUND ART

FIG. 1 shows an exemplary network structure of an Evolved Universal Mobile Telecommunications System (E-UMTS) as a mobile communication system to which a related art and the present invention are applied. The E-UMTS system is a system that has evolved from the UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN generally comprises a terminal (i.e., User Equipment (UE)), a base station (i.e., eNode B), a serving gateway (S-GW) that is located at an end of the E-UMTS network and connects with one or more external networks, and a Mobility Management Entity (MME) that performs mobility management functions for a mobile terminal. One eNode B may have one or more cells.

FIG. 2 shows an exemplary architecture of a radio interface protocol between a terminal and a base station according to the 3GPP radio access network standard. The radio interface protocol is horizontally comprised of a physical layer, a data link layer, and a network layer, and vertically comprised of a user plane for transmitting user data and a control plane for transferring control signaling. The protocol layer may be divided into L1 (Layer 1), L2 (Layer 2), and L3 (Layer 3) based upon the lower three layers of the Open System Interconnection (OSI) standards model that is widely known in the field of communication systems.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a header compression function that reduces unnecessary control information such that data being transmitted by employing Internet Protocol (IP) packets, such as IPv4 or IPv6, can be efficiently sent over a radio interface that has a relatively small bandwidth.

The Radio Resource Control (RRC) layer located at the lowermost portion of Layer 3 is only defined in the control plane, and handles the control of logical channels, transport channels, and physical channels with respect to the configuration, re-configuration and release of radio bearers (RB). Here, the RB refers to a service that is provided by Layer 2 for data transfer between the mobile terminal and the UTRAN.

Hereinafter, description of a method for receiving data by a terminal in the LTE system will be given. As shown in FIG. 4, the base station and the terminal generally transmit/receive data through a Physical Downlink Shared Channel (PDSCH) using a transport channel DL-SCH, with the exception of a specific control signal or a specific service data. Also, information on which terminal (or a plurality of terminals) should receive data of the PDSCH or information on how the terminals should receive the PDSCH data and perform decoding, is transmitted by being included in the physical layer PDCCH (Physical Downlink Control Channel).

For instance, it is assumed that a certain PDCCH is under a CRC masking as an "A" RNTI (Radio Network Temporary Identifier), and is being transmitted in a certain sub-frame by including information about data being transmitted in transfer format information "C" (e.g., a transport block size, modulation and coding information, etc.) through radio resources "B" (e.g., a frequency location). Under such condition, one or more terminals in a corresponding cell may monitor the PDCCH by using their own RNTI information. If there are one or two or more terminals having A RNTI at a corresponding point of time, the terminals shall receive the PDCCH, and also a PDSCH indicated by B and C through the received information on PDCCH.

During this procedure, an RNTI is transmitted to inform that allocation information of radio resources transmitted through each PDCCH conforms to which terminals. The RNTI is divided into a dedicated RNTI and a common RNTI. The dedicated RNTI is used for data transmission/reception to a certain terminal. The common RNTI is used when data is transmitted or received to/from terminals to which the dedicated RNTI is not allocated since its information is not registered in the base station or when information commonly used by a plurality of terminals (e.g., system information) is transmitted. For instance, during the RACH procedure, RA-RNTI or T-C-RNTI is the common RNTI.

In the related art, an RRC connection should be established to perform a call establishment between the terminal and the base station. During the RRC connection process, a security setup is required. However, the process for the security setup is not performed by a test method through a security setup-related message having more reliability, thereby causing a problem of inefficiently performing an authentication between entities in a radio (wireless) call connection process.

DISCLOSURE OF INVENTION

Technical Solution

The present invention has been developed in order to solve the above described problems of the related art. As a result, the present invention provides a method for performing an authentication of entities during an establishment of a wireless call connection.

To implement at least the above feature in whole or in parts, the present invention may provide a method of performing a security setup process in a mobile communications system, the method comprising: determining a candidate set for a security setup parameter; receiving a parameter related to a security setup; and determining whether or not the received parameter is matched with at least one of the determined candidate set, and a mobile terminal for performing a security setup process in a mobile communications system, the mobile terminal comprising: a radio protocol entity adapted to determine a candidate set for a security setup parameter, to receive a parameter related to a security setup, and to determine whether or not the received parameter is matched with at least one of the determined candidate set.

Additional features of this disclosure will be set forth in part in the description which follows and in part will become apparent to those having ordinary skill in the art upon examination of the following or may be learned from practice of this disclosure. The objectives and other advantages of this disclosure may be realized and attained by the structure particularly pointed out in the written description and claims hereof as well as the appended drawings.

MODE FOR THE INVENTION

Hereinafter, description of structures and operations of the preferred embodiments according to the present invention will be given with reference to the accompanying drawings.

One aspect of the present invention is the recognition by the present inventors regarding the problems and drawbacks of the related art described above and explained in more detail hereafter. Based upon such recognition, the features of the present invention have been developed.

Although this disclosure is shown to be implemented in a mobile communication system, such as a UMTS developed under 3GPP specifications, this disclosure may also be applied to other communication systems operating in conformity with different standards and specifications.

Figure 1:
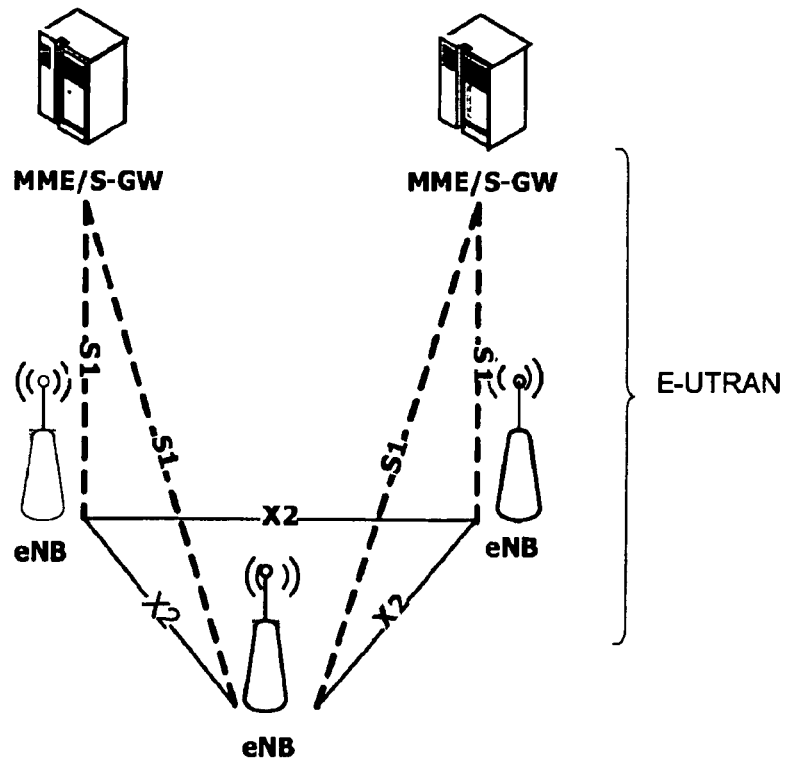
FIG. 1 shows an exemplary network structure of an Evolved Universal Mobile Telecommunications System (E-UMTS) as a mobile communication system to which a related art and the present invention are applied.
Figure 2:
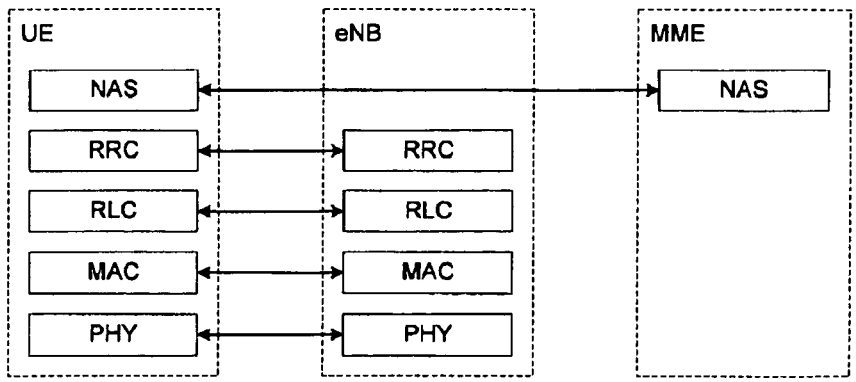
FIG. 2 shows an exemplary control plane architecture of a radio interface protocol between a terminal and a UTRAN (UMTS Terrestrial Radio Access Network) according to the 3GPP radio access network standard.
Figure 3:
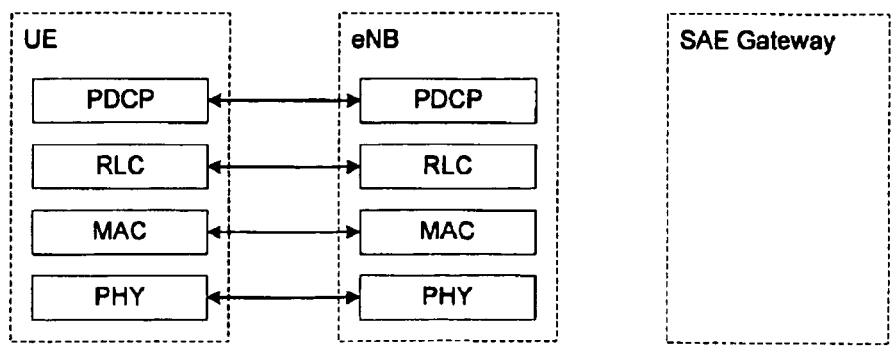
FIG. 3 shows an exemplary user plane architecture of a radio interface protocol between a terminal and a UTRAN (UMTS Terrestrial Radio Access Network) according to the 3GPP radio access network standard.
Figure 4:
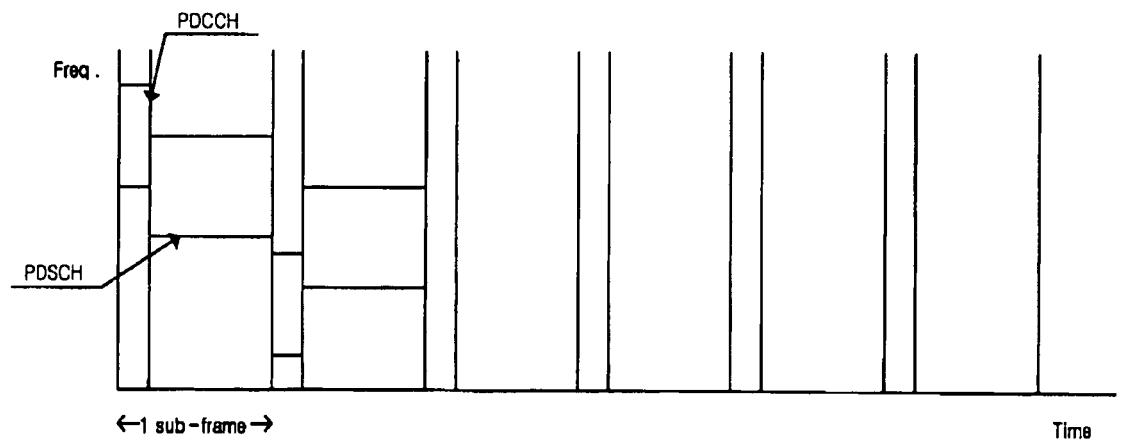
FIG. 4 shows a related art method for allocating radio resources.
Figure 5:
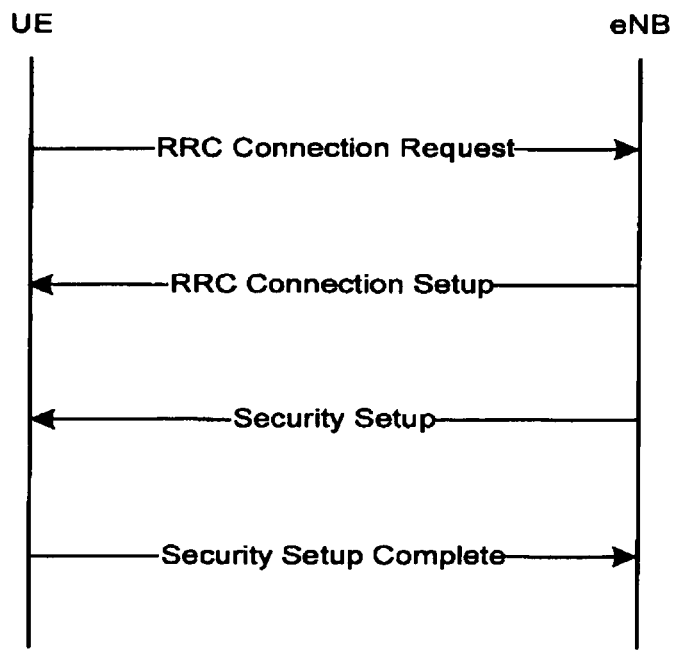
FIG. 5 shows an exemplary process for RRC connection setup and security setup.

FIG. 5 shows an exemplary RRC connection setup method so as to perform a call setup between the terminal and the base station (eNB). As shown in FIG. 5, an RRC connection setup process is a process which establishes an RRC connection serving as a path to exchange control information such that the terminal and the base station can manage a call setup. First, the terminal may transmit an RRC Connection Request message to the base station so as to transmit information including its identifier to the base station. The eNB may transmit an RRC Connection Setup message to the terminal so as to deliver information for a call setup and the RRC connection setup.

Then, additionally, the terminal and the base station may perform a security setup, through which the terminal and the base station can build an environment for performing ciphering and integrity check. The base station may transmit a Security Setup message to the terminal, and then the terminal may transmit a Security Setup Complete message in response to the Security Setup message, thereby completing the security setup. The security setup message may be forwarded with the RRC connection setup message or may be transmitted at any time while a call is established. Here, for the security-related message, a HFN (Hyper Frame Number) initial setup value, etc. may be transmitted. Here, the transmitted HFN initial setup value may be used for the terminal or the base station to set a context of the ciphering or integrity check.

In general, the terminal and the UTRAN (Node B, eNB) exchange a variety of messages. In most cases, a security check is subject to protect data included in those messages. Such security check may include the ciphering and integrity check. The ciphering is implemented in which a transmitting side and a receiving side are configured to add a certain MASK known only to both sides into a message, thereby preventing a third party who does not know the certain MASK from knowing a content of the message. In addition, unlike the ciphering, the integrity check may be used to verify that a content of a transmitted message is not changed during transmission or from an unauthorized party. That is, the integrity check is a process required to determine whether or not the content of the received message is changed during transmission by a third party. The integrity check may be performed over most of RRC messages and all control messages transmitted to an upper end of the RRC in the UMTS system. The ciphering may be only performed to general user data. Further, the integrity check may be performed in the RRC layer.

Information needed to perform the integrity check is described as follows:

IK (Integrity Key): As an integrity key, it is generated through an authentication process by the upper end of the RRC and then is notified to the RRC. This value is not a value that is transmitted over a radio section. Rather, it is a value which is calculated and used by an upper end of a terminal RRC and an upper end of a network RRC, re-spectively, based on a specific input value.

Figure 6:
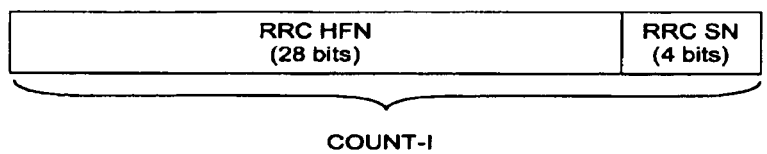
FIG. 6 shows an exemplary structure of COUNT-I among information required for an integrity check.

COUNT-I: It is a value of a sequence number for an integrity check and has a structure as shown in FIG. 6. It comprises two areas—an upper area of 28 bits, called an "RRC HFN (Hyper Frame Number)", and a lower area of 4 bits, called an "RRC SN (Sequence Number)".

MESSAGE: It indicates a transmitted message itself.

DIRECTION (Direction Identifier, 1 bit): It is a direction identifier, and is set to 0 for an uplink and to 1 for a downlink.

Figure 7:
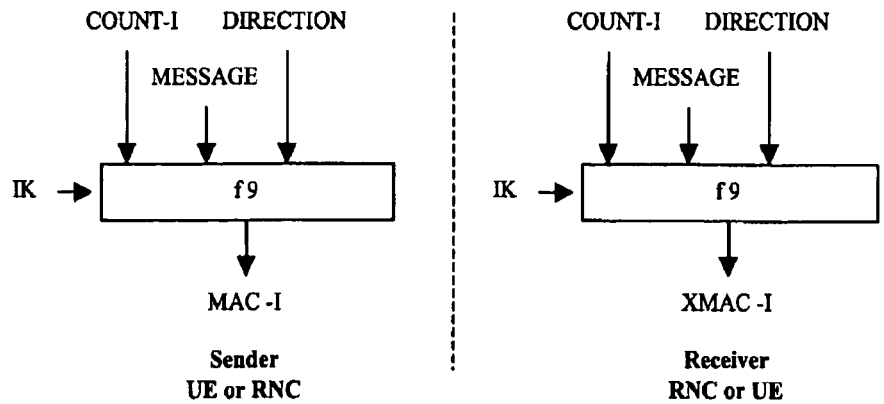
FIG. 7 shows an exemplary method for performing an integrity check.

FIG. 7 shows an exemplary view of an integrity check process. A transmitting side and a receiving side may perform operations shown in FIG. 7 using the above-described information as an input value, thereby generating MAC-I and XMAC-I values. Here, the MAC-1 may be an integrity check authentication value generated by the transmitting side, and the XMAC-I may be an integrity check authentication value generated by the receiving side. If all input values are the same, the MAC-I value and the XMAC-I value generated by performing the operations shown in FIG. 7 would be the same. However, if a message is changed during transmission, input values called "MESSAGE" of the receiving and transmitting sides would be different from each other, thus to have the MAC-I and the XMAC-I values different from each other. Accordingly, the receiving side should compare the MAC-I value and the XMAC-I value with each other. If the two values are different, the receiving side should determine that the message is damaged, thus to discard the message.

Here, the transmitting side may change some of the input values used in the processes shown in FIG. 7 at every time a new message needs to be transmitted. And, the transmitting side may change some of the input values so as to generate a new MAC-I at each time. This may be to prevent a third party from watching for an unguarded point of security by re-using the MAC-I value. For this, the transmitting side would increase the SN value (i.e., a lower 4-bit value of the COUNT-I) by 1 at each time the message is transmitted. Here, due to the 4-bit SN value, the SN value has a value from 0 to 15, and is sequentially increased by 1 from 0. If the SN value becomes 15, the next SN value would become 0 and then is increased by 1. In this manner, at every time the SN value returns back to 0 from 15, the HFN (i.e., an upper value of the COUNT-I) would be also increased by 1. Accordingly, this method would ultimately have the same effect as the COUNT-I increases by 1 each time, and as mentioned above, some of the input values in the calculation process of an integrity ciphering authentication value would be changed.

If the receiving side checks an SN value of a received message and determines that the checked SN value indicates a finishing of one cycle, the receiving side increases its HFN value by 1. In this way, the receiving side may have the same COUNT-I of the transmitting side. This method would allow the transmitting and the receiving sides to have the same COUNT-I information even though the SN value only is transmitted. Besides, a breaking of security information by a third party, which may occur when all of the COUNT-I itself is transmitted, can be prevented.

Accordingly, in order to allow the receiving side to accurately calculate the XMAC-I and to prevent the breading of security information, the transmitting side may transmit a message by adding the SN value (i.e., the lower value of the COUNT-I) thereto at each transmission. Also, it may transmit the message by adding the MAC-I value which will be used by the receiving side as a reference in the integrity check. Here, the receiving side may need to verify whether or not the thusly transmitted SN value is a correct value. For this, the receiving side may manage its own local variable SN by utilizing all the SN values that have been received so far. If the transmitted SN value and the local variable SN value of the receiving side are the same, the receiving side would immediately discard the message, considering that the third party may send the message by using the same security information or the same message would be transmitted twice.

The receiving side may use the transmitted SN value to configure the COUNT-I, and may use the value and parameters set by the receiving side to calculate the XMAC-1 through the processes shown in FIG. 7. Then, the receiving side may compare the MAC-I value and the XMAC-I value transmitted with the message, and then may determine whether or not the integrity check is successful. Here, if the received message is determined to pass the integrity check, the receiving side may store the SN value included in the message into the local variable SN, thus to use to check an SN value of the next message.

As shown in the security setup process, when the terminal and the base station transmit the security setup-related message, it should be checked that only a trusted entity may receive the message, or the received security setup-related message has been received from a trusted entity only. If the received security setup message is received from a security attacker, an entity having received the message should delete the received security setup-related message.

Figure 8:
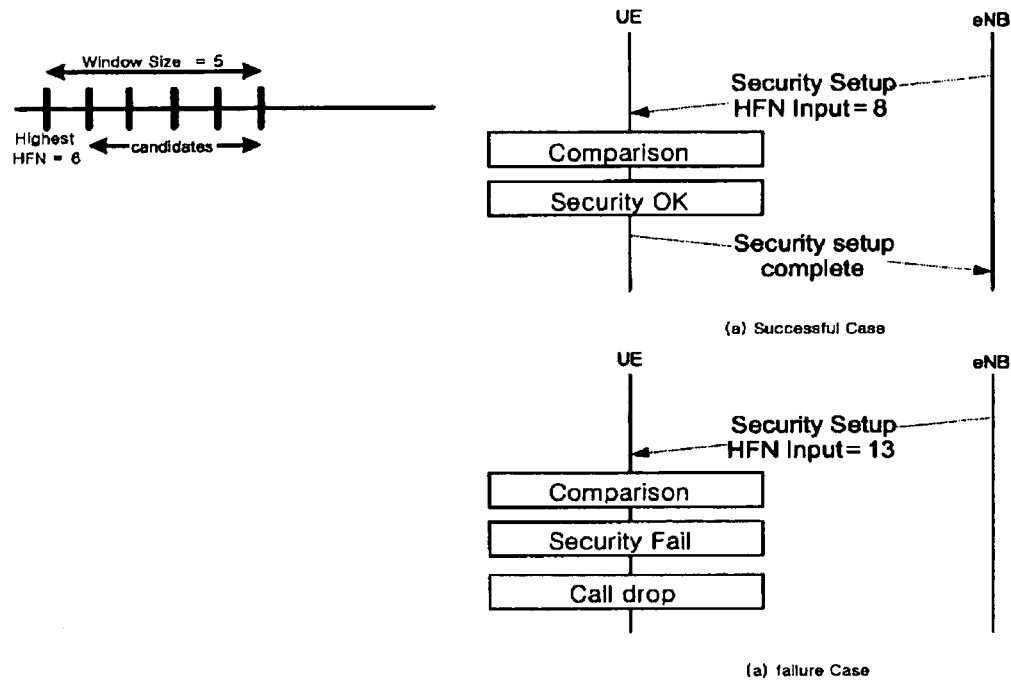
FIG. 8 shows an exemplary method for performing an authentication between entities in a radio call establishment process according to the present invention.

FIG. 8 shows an exemplary method for performing an authentication between entities in a radio call setup process according to the present invention. As shown in FIG. 8, it is assumed that 6 is the highest among the HFN values used before the terminal and the base station exchange the security setup message, and a window size for security value candidates is 5. With such assumption, a candidate set for security setup input value would be from 7 to 11. Here, if the terminal and the base station apply the same value to both the HFN and the window size for security value candidates, the terminal and the base station would have the same candidate set for security setup input value. A case (a) in FIG. 8 shows that the base station has a valid candidate set for the security setup input, and case (b) shows that the base station does not have a valid candidate set for the security setup input. That is, in the case (a), the base station transmits a security setup message by including a security setup input value of "8." Then, having received the security setup message, the terminal regards the base station as a valid base station since the security setup input value is included in the candidate set for the security setup input value (7-11) calculated by the terminal itself, and sets a HFN in ciphering and integrity check by using the value. On the contrary, the case (b) shows that the base station and the terminal manage different candidate sets for security setup input values or that the base station is not a valid base station. In the case (b), the base station transmits a security setup message by setting the security setup input value to "13" to the terminal. Then, the terminal determines that the security setup message is from an invalid base station since the value is not included in the candidate set for security setup input value (7-11). Accordingly, the terminal may terminate a call or release the RRC connection being established. Then, the terminal determines that the base station is a barred base station, thereby performing no further connection attempt. Additionally, it may select another cell.

Here, the above exemplary embodiment may also be applied in reverse. That is, when the terminal transmits an RRC connection setup request message, it may transmit a HFN setup value. This setup value can be set as a value between a HFN value used in a previous RRC connection by the terminal, and the HFN value added into the window size for security value candidates. The base station checks the validity of the received value so as to determine whether or not the RRC connection should be established with the terminal.

Also, an offset value may be utilized for performing an authentication between entities in a radio call setup process. For example, it is assumed that 6 is the highest among the HFN values used before the terminal and the base station exchange the security setup message, a window size for security value candidates is 5, and the offset value is 2. With such assumption, a candidate set for security setup input value would be from 9 to 13.

According to the present invention, when the terminal and the base station exchange a security setup value, a window may be used to get a valid range of a value, thereby providing a method for rapidly authenticating the terminal and the base station to each other in more efficient manner through a security setup-related message having more reliability.

Further, the present invention may provide a method for efficiently authenticating an entity which transmits a security-related message in a process of exchanging the security-related message between a base station and a terminal. For this, there is provided a method for authenticating the entity by exchanging a security authentication setup value between the terminal and the network (eNB).

That is, the present invention is to provide a method for authenticating a security-related message by a receiving side when the terminal or the base station transmits the security-related message. The base station and the terminal are configured to manage a candidate set for security setup input value, and to select a value from the candidate set. Then, the base station and the terminal are configured to set the selected value as a security setup input value, and to transmit the security-related message by including the set value therein. When a security-related message has been received, the base station and the terminal are configured to examine whether or not the security setup input value contained in the security-related message is included in a candidate set for security setup input value. During this process, as a result of the examination, if the received security setup input value is not included in the candidate set, a call may be dropped or an RRC connection and NAS connection may be released. Additionally, in this process, if the terminal receives the security-related message and the received security setup input value is not included in the candidate set, the terminal regards a corresponding base station as a barred base station, or if the terminal has moved to another cell, it starts a security setup, if necessary. During this process, if the base station receives the security-related message and the received security setup input value is not included in the candidate set, the base station regards a corresponding terminal as a barred terminal and denies further access by the terminal.

During this process, the candidate set of the security setup input value may be expressed as a security setup reference value and a window size for security value candidates. The candidate set of the security setup input value is a set of the numbers between a security setup reference value and a window size for the security value candidates added to the security setup reference value. The security setup reference value may be excluded from the candidate set of the security setup input value. The security setup reference value may be a HFN (Hyper Frame Number) or the highest among HFN values used in radio bearers to which the security setup set between the terminal and the base station is applied. A eNB notifies the window size for security value candidates to the terminal. The eNB notifies the window size for security value candidates to the terminal in a call setup process and the eNB notifies the window size for security value candidates to the terminal via SI (system information). If a call is terminated or an RRC connection is released, the terminal stores HFN values being used. Then, if a call is setup again or an RRC connection is established, the terminal manages a candidate set for security setup input value by using the stored HFN value and the window size for security value candidates.

It can be said that the present invention may provide a method of performing a security setup process in a mobile communications system, the method comprising: determining a candidate set for a security setup parameter; receiving a parameter related to a security setup; determining whether or not the received parameter is matched with at least one of the determined candidate set; and terminating at least one of a RRC connection, a NAS (non-access stratum) connection and a call connection between a terminal and a network, if the received parameter is not matched with the at least one of the candidate set, wherein the candidate set is determined by a security setup reference value and a security setting window size value, the candidate set is determined by adding the security setup reference value, the security setting window size value and/or an offset value, the security setup reference value is a HFN (hyper frame number) or the highest HFN among a plurality of HFN used in a radio bearer that is applied to the security setup process, the security setting window size value is received from a network during a call setup or through system information (SI).

Also, the present invention may provide a mobile terminal for performing a security setup process in a mobile communications system, the mobile terminal comprising: a radio protocol entity adapted to determine a candidate set for a security setup parameter, to receive a parameter related to a security setup, and to determine whether or not the received parameter is matched with at least one of the determined candidate set.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention should not limit the scope of the present invention to a certain type of wireless communication system. the present invention is also applicable to other wireless communication systems using different air interfaces and/or physical layers, for example, TDMA, CDMA, FDMA, WCDMA, OFDM, EV-DO, Mobile Wi-Max, Wi-Bro, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of performing a security setup process in a mobile communications system, the method comprising:
    determining, by a terminal, a candidate set for a security setup parameter,
    wherein the candidate set is determined by a security setup reference value and a security setting window size value or is determined by the security setup reference value, the security setting window size value and an offset value;
    receiving a parameter related to a security setup; and
    determining whether or not the received parameter is matched with at least one of the determined candidate set.

2. The method of claim 1, further comprising:
    terminating at least an RRC (Radio Resource Control) connection, a NAS (non-access stratum) connection or a call connection between the terminal and a network, if the received parameter is not matched with the at least one of the determined candidate set.

3. The method of claim 1, wherein the candidate set is determined by adding the security setup reference value and the security setting window size value.

4. The method of claim 3, wherein the security setup reference value is a HFN (hyper frame number).

5. The method of claim 4, wherein the security setup reference value is the highest HFN among a plurality of HFN used in a radio bearer that is applied to the security setup process.

6. The method of claim 3, wherein the security setting window size value is received from a network during a call setup.

7. The method of claim 3, wherein the security setting window size value is received from a network through system information (SI).

8. A mobile terminal for performing a security setup process in a mobile communications system, the mobile terminal comprising:
    a radio protocol entity adapted to determine a candidate set for a security setup parameter, to receive a parameter related to a security setup, and to determine whether or not the received parameter is matched with at least one of the determined candidate set,
    wherein the candidate set is determined by a security setup reference value and a security setting window size value or is determined by the security setup reference value, the security setting window size value and an offset value.

* * * * *